United States Patent
He et al.

(10) Patent No.: US 8,353,000 B2
(45) Date of Patent: Jan. 8, 2013

(54) SYSTEM AND CHARGING CONTROL METHOD OF NETWORK CONVERGENCE POLICY AND CHARGING CONTROL ARCHITECTURE

(75) Inventors: Xianhui He, Shenzhen (CN); Liang Gu, Shenzhen (CN); Yong Xie, Shenzhen (CN); Jianjun Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 678 days.

(21) Appl. No.: 12/469,444

(22) Filed: May 20, 2009

(65) Prior Publication Data

US 2009/0228956 A1  Sep. 10, 2009

Related U.S. Application Data

(63) Continuation of application No. PCT/CN2007/071097, filed on Nov. 20, 2007.

(30) Foreign Application Priority Data

Nov. 20, 2006 (CN) .......................... 2006 1 0149176
Dec. 6, 2006 (CN) .......................... 2006 1 0162104
Feb. 5, 2007 (CN) .......................... 2007 1 0000424
May 21, 2007 (CN) .......................... 2007 1 0106617

(51) Int. Cl.
*G06F 17/00* (2006.01)
*G06F 7/04* (2006.01)
*H04M 11/00* (2006.01)
*H04M 3/42* (2006.01)
*H04W 72/00* (2009.01)
*H04W 4/24* (2009.01)
*H04L 12/14* (2006.01)
*G06F 15/16* (2006.01)

(52) U.S. Cl. ........... 726/1; 726/28; 455/406; 455/414.1; 455/452.1

(58) Field of Classification Search .............. 726/1, 28; 455/406

See application file for complete search history.

(56) References Cited

U.S. PATENT DOCUMENTS 7,120,156 B2  10/2006 Foti et al.
(Continued)

FOREIGN PATENT DOCUMENTS

CN  1553686 A  12/2004
(Continued)

OTHER PUBLICATIONS

Ivaylo Atanasov, Evelina Pencheva, Dora Marinska; "Parlay X web services for policy and charging control in multimedia networks"; Jan. 2012; Advances in Multimedia, vol. 2012; pp. 1-12.*

(Continued)

*Primary Examiner* — Matthew Smithers
*Assistant Examiner* — Courtney Fields
(74) *Attorney, Agent, or Firm* — Leydig, Voit & Mayer, Ltd.

(57) ABSTRACT

A system and charging control method of network convergence policy and charging control architecture are disclosed, based on the QoS parameter, charging policy and user subscribing information granted by the service layer, the PCRF confirms PCC rule, and provides the PCC rule to the policy distribution function PDF. As the interface between the PCRF and PCC policy performing entity, the PDF performs the protocol conversion and information distribution. Based on the PCC rule, the PCC policy performing entity performs QoS policy of the service data flow and the detecting and charging of the service flow.

22 Claims, 7 Drawing Sheets

U.S. PATENT DOCUMENTS

| | | |
|---|---|---|
| 7,450,591 B2 | 11/2008 | Körling et al. |
| 2003/0108015 A1 | 6/2003 | Li |
| 2005/0122945 A1 | 6/2005 | Hurtta |
| 2007/0066286 A1* | 3/2007 | Hurtta .......................... 455/414.1 |
| 2008/0014955 A1* | 1/2008 | Shannon et al. ............ 455/452.1 |
| 2008/0120700 A1* | 5/2008 | Pandey et al. ...................... 726/4 |
| 2009/0158442 A1* | 6/2009 | Zhang ............................. 726/28 |

FOREIGN PATENT DOCUMENTS

| | | |
|---|---|---|
| CN | 1729648 A | 2/2006 |
| CN | 1852384 A | 10/2006 |
| WO | WO 03/040898 A1 | 5/2003 |
| WO | WO 2005/050917 A2 | 6/2005 |
| WO | WO 2010049002 A1 * | 5/2010 |

OTHER PUBLICATIONS

Written Opinion of the International Searching Authority in corresponding PCT Application No. PCT/CN2007/071097 (Jan. 17, 2008).

International Search Report in corresponding PCT Application No. PCT/CN2007/071097 (Jan. 17, 2008).

"3GPP TS 29.212—3rd Generation Partnership Project; Technical Specification Group Core Network and Terminals; Policy and Charging Control over Gx reference point (Release 7)," Draft Version 0.3.0, May 2006, 3rd Generation Partnership Project, Valbonne, France.

"3GPP TS 29.212—3rd Generation Partnership Project; Technical Specification Group Core Network and Terminals; Policy and Charging Control over Gx reference point (Release 7)," Version 0.3.0, May 2006, 3rd Generation Partnership Project, Valbonne, France.

"3GPP TS 29.213—3rd Generation Partnership Project; Technical Specification Group Core Network and Terminals; Policy and Charging Control signalling flows and QoS parameter mapping; (Release 7)," May 2006, Version 0.1.0, 3rd Generation Partnership Project, Valbonne, France.

"C3-060291—TS 29.212 Version 0.3.0," 3GPP TSG-CT WG3 Meeting #40, May 8-12, 2006, Siemens, Sophia-Antipolis, France.

"C3-060292—Version 0.1.0 of TS 29.213," 3GPP TSG-CT WG3 Meeting #40, May 8-12, 2006, Ericsson, Sophia-Antipolis, France.

"3GPP IMS PCC Framework integration with WiMAX," WiMAX Forum Network Working Group, Release 1.5 IMS Stage 2 discussion, Intel Corporation.

* cited by examiner

SYSTEM AND CHARGING CONTROL METHOD OF NETWORK CONVERGENCE POLICY AND CHARGING CONTROL ARCHITECTURE

CROSS-REFERENCE TO RELATED APPLICATIONS

This application is a continuation of International Patent Application No. PCT/CN2007/071097, filed Nov. 20, 2007, which claims priority to Chinese Patent Application Nos. 200610149176.9, 200610162104.8, 200710000424.8, and 200710106617.1, filed Nov. 20, 2006, Dec. 6, 2006, Feb. 5, 2007, and May 21, 2007, respectively, all of which are hereby incorporated by reference in their entirety.

FIELD OF THE INVENTION

The present invention relates to network convergence technology, and more particularly, to a system and a charging control method of network convergence policy and charging control (PCC) architecture.

BACKGROUND OF THE INVENTION

The architecture of Worldwide Interoperability for Microwave Access (WiMAX) network is as shown in FIG. 1A. A WiMAX network mainly comprises three parts, namely, a mobile station (MS), an access service network (ASN), and a connectivity service network (CSN), of which the ASN mainly includes a base station (BS) and an access service network gateway (ASN-GW), and the CSN mainly includes such logic entities as a prepaid server (PPS) and an authentication authorization accounting server (AAA server). The MS and the ASN are connected via interface R1, the MS and the CSN are connected via interface R2, the ASN and the CSN are connected via interface R3, the ASNs are interconnected via interface R4, the CSNs are interconnected via interface R5, and the BS in the ASN is connected to the ASN-GW via interface R6. The wireless side, namely, the R1 side, is of Wireless Metropolitan Area Network Access technology based on Institute of Electrical and Electronics Engineers (IEEE) specification 802.16.

The framework of the latest quality of service (QoS) for WiMAX network work group (NWG) specification is as shown in FIG. 1B, where the MS is the mobile terminal of a user through which the user interacts with the network; the service flow manager (SFM) is configured to establish user service flows and assign radio resources to the established service flows, which as functional entity resides in the ASN; the service flow authorization (SFA) entity is configured to authorize the service flows, which as functional entity resides in the ASN; the policy function (PF) entity is configured to provide policies to the user's service flows, which as functional entity is provide by the network service provider (NSP), and when the user roams, a visited PF (V-PF) and a home PF (H-PH) are provided; and the application function (AF) entity is a functional entity that provides application services, and the MS of the user connects to and accesses the AF directly via application layer protocols, and the AF notifies the PF to establish initiatively service flows for the user, this functional entity is provided by the NSP.

FIG. 1C is a view illustrating a prior art WiMAX NWG specification charging architecture. As shown in FIG. 1C, MS is equivalent to a user in charging, and an accounting client collects all charging information and provides the same to the AAA server; an AAA proxy is an optional intermediate device that processes the received charging datagram to generate a new charging datagram and forwards it to the real AAA server, such as a home AAA server or a visited AAA server; the home AAA server is an AAA server to which the user initially registered or an AAA server in the home network of the user, stored in the home AAA server is subscription information of the user, including charging policies, and the charging processing of the user are mostly carried out in the home AAA server; the visited AAA server is an AAA server in the place which the user visits, and carries out the recording, transparent transmission, and forwarding of charging information when the user roams.

FIG. 1D is a view schematically showing a prior art charging reference model. As shown in FIG. 1D, the user logs in to, visits, and logs out of the network using a user terminal in a certain manner in accordance with the requirements of the network, the charging point automatically initiates a charging datagram in accordance with the visiting circumstances of the user, and the accounting server generates a corresponding bill for the user based on the received charging datagram. Charging is transparent to the user, starts from the moment the user logs in to the network, and automatically ends when the user logs out of the network.

The PCC framework is a policy control and charging control function framework defined by the 3rd Generation Partnership Project (3GPP) and 3GPP2 to be applicable to various internet protocols (IP) for connection and access to networks. The PCC carries out resource and admission control and achieve certain QoS control and charging policy control with respect to characteristics of mobile access networks. The main functions provided thereby include: policy control based on customized information of users and charging control based on service data flows. The PCC is located between a service control layer and an access or bearer layer to shield the service control layer from specific technology and topological information of the access or bearer layer. The PCC receives QoS authorization parameters associated with the service from the serve control layer, combines them with admission control policies and topographic information of the network, converts the service QoS parameters into IP QoS parameters, and provides them to the associated access or bearer layer nodes and the service gateway nodes. These nodes achieve corresponding QoS control, based on the received information and their own functions. Policy control mainly indicates gating control and QoS control, while charging control indicates flow based charging (FBC).

FIG. 1E schematically shows the PCC basic functional architecture of the existing 3GPP/3GPP2 standards. As shown in FIG. 1E, the AF is a functional entity that provides applications which need to perform dynamic policy control and charging control on user plane of IP access network. The subscription profile repository (SPR) entity stores subscription profiles of users. The policy control and charging rule function (PCRF) entity executes decision on control policy and decision on flow-based charging policy. Execution of decision on control policy means that the PCRF determines QoS authorization information, such as QoS levels and bit rates, etc., based on service information from the AF and subscription profiles in SPR, and execution of decision on flow-based charging policy means that the PCRF can use subscription profiles as basis for policy control decisions and charging control decisions to determine the PCC rules and provide the same to the policy and charging enforcement function (PCEF). The PCEF entity is for QoS policy enforcement, service data flow detection, and execution of flow-based charging and gating control functions. Service data flow detection means that the PCEF detects service data flows based on a service data flow template in the activated PCC rules to recognize whether data packets belong to a single service data flow. QoS policy enforcement means that the PCEF enforces authorized QoS control of a service data flow in accordance with the activated PCC rules. Execution of flow-based charging means that the PCEF charges passing service data flows in accordance with charging policy and charging key in the PCC rules, in which the PCEF collects and reports charging information in accordance with charging requirements in the PCC rules. Execution of gating control means that the PCEF allows service data flows to pass only when gate is opened. Online charging system (OCS) is for online charging of the application layer, the PCEF requests the OCS for prepayment quota, and reports to the OCS in real time when PCEF generates a bill. Offline charging system (OFCS) is for offline charging of the application layer in a manner of offline charging, and the PCEF periodically reports bills to the OFCS after the bills are generated.

With the demand for evolution and convergence of the networks, there is a need for unified architecture for performing policy and charging control of the network, and it is hence necessary to convergence the WiMAX network and the PCC architecture of the 3GPP/3GPP2 network to achieve unified policy control and charging control. However, such a convergence solution is currently unavailable.

BRIEF SUMMARY OF THE INVENTION

The embodiments of the present invention provide a system and a processing method of network convergence policy and charging control architecture to converge a WiMAX network with 3GPP/3GPP2 PCC architecture.

An embodiment of the present invention provides a system of network convergence policy and charging control architecture, comprising a policy control and charging rule function (PCRF) entity, a policy distribution function (PDF) entity, and a PCC policy enforcement entity, wherein the PCRF performs user QoS authorization, based on QoS parameters authorized by service layer, charging policy information, and user subscription profiles, determines policy and charging control PCC rules, and provides the PCC rules to the PDF; the PDF serves as an interface between the PCRF and the PCC policy enforcement entity to perform protocol conversion and information distribution; and the PCC policy enforcement entity executes QoS authorization, QoS policy, and charging on a service data flow, in accordance with the PCC rules.

An embodiment of the present invention further provides a system of network convergence policy and charging control architecture, comprising an access service network (ASN), a connectivity service network (CSN), a policy control and charging rule function (PCRF) entity, a policy distribution function (PDF) entity, and a PCC policy enforcement entity in a Worldwide Interoperability for Microwave Access (WiMAX) network, wherein the PCRF performs user QoS authorization, based on QoS parameters authorized by a service layer, charging policy information, and user subscription profiles, determines policy and charging control PCC rules, and provides the PCC rules to the PDF; the PDF serves as an interface between the PCRF and the PCC policy enforcement entity to perform protocol conversion and information distribution; and the PCC policy enforcement entity executes QoS authorization, QoS policy, and charging on a service data flow, in accordance with the PCC rules.

An embodiment of the present invention further provides a policy and charging control method of network convergence policy and charging control architecture, comprising: a policy distribution function (PDF) entity obtaining PCC rules determined by a policy control and charging rule function (PCRF) entity, based on QoS parameters authorized by a service layer, charging policy information, and user subscription profiles; the PDF providing the PCC rules to a PCC policy enforcement entity; and the PCC policy enforcement entity executing QoS authorization and charging on a service data flow, in accordance with the PCC rules.

In the embodiments proposed in the present invention, the PCRF determines the PCC rules based on QoS parameters authorized by a service layer, charging policy, and user subscription profiles, the policy distribution function (PDF) entity serves as an interface between the PCRF and the PCC policy enforcement entity to perform protocol conversion and information distribution, and the PCC policy enforcement entity executes QoS authorization and charging on a service data flow in accordance with the PCC rules, whereby a practically feasible solution is proposed for fusing communications systems of wireless networks, such as WiMAX network and 3GPP/3GPP2 network PCC architecture. PCC architecture is adopted to achieve policy control and charging control of services. The problems in connection with convergence of function entities in the PCC architecture with such function entities in the converged wireless network (e.g., WiMAX network) as the policy control entity (SFA), the data path function (DPF) entity, the accounting client/accounting agent and/or HA, are solved. A processing flow and a fusing solution are proposed so that the converged wireless network (such as WiMAX network) makes use of the PCC architecture to achieve policy control and charging control of services.

DETAILED DESCRIPTION OF THE INVENTION

Figure 1A:
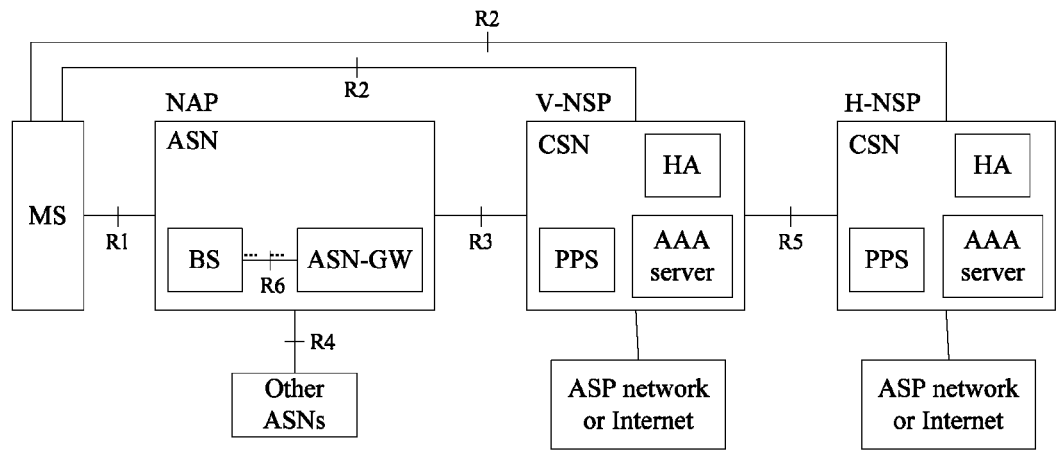
FIG. 1A is a schematic view showing the architecture of the prior art WiMAX network.
Figure 1B:
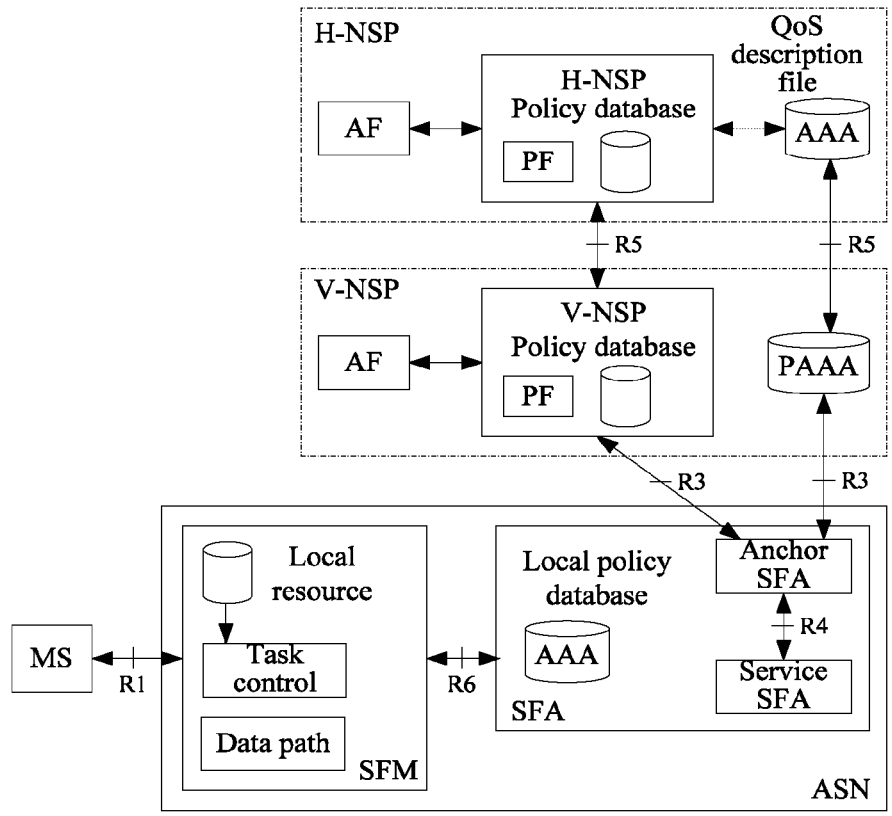
FIG. 1B is a schematic view showing a QoS framework of the prior art WiMAX NWG standard.
Figure 1C:
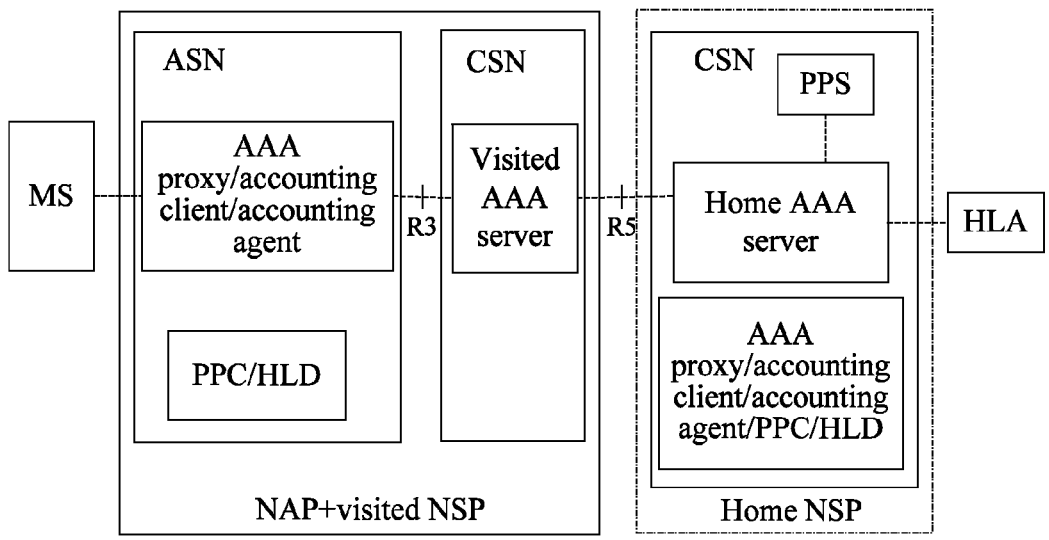
FIG. 1C is a schematic view showing a charging architecture of the prior art WiMAX NWG standard.
Figure 1D:
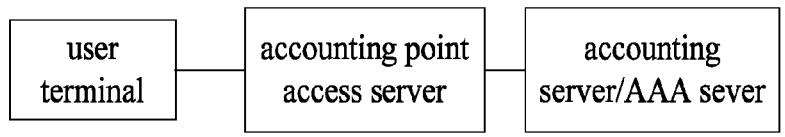
FIG. 1D is a schematic view showing a prior art charging reference model.
Figure 1E:
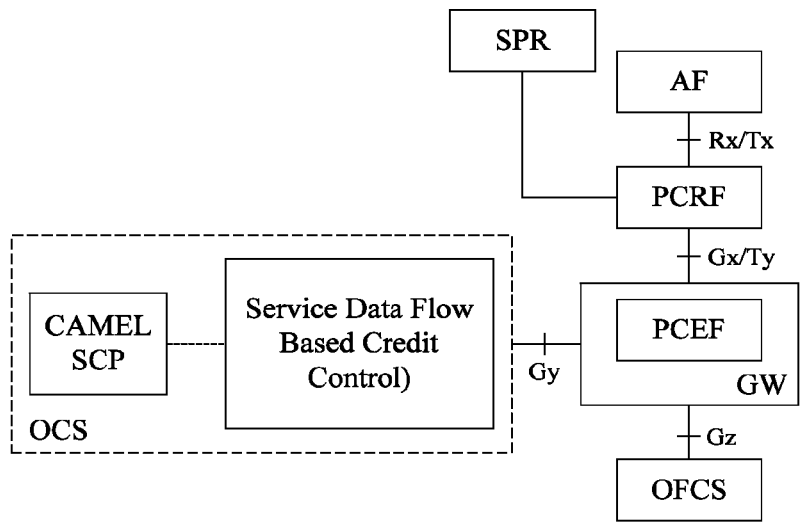
FIG. 1E is a schematic view showing a PCC basic functional architecture of the prior art 3GPP/3GPP2 standard.

In the embodiments proposed in the present invention, the PCRF determines PCC rules, based on QoS parameters authorized by a service layer, charging policy information, and user subscription profiles, the policy distribution function (PDF) entity serves as an interface between the PCRF and the PCC policy enforcement entity to perform protocol conversion and information distribution, and the PCC policy enforcement entity executes QoS authorization and charging on a service data flow, in accordance with the PCC rules. The PCC rules include QoS policy control information, charging policy information, and service flow detection information, etc. The PDF can be implemented as a separate entity, or implemented in PCRF, or ASN, or HA, or implemented in PCRF and ASN, or in PCRF and HA, or in PCRF, ASN, and HA. The PDF can be integrated with the PCC policy enforcement entity, in which case the PDF achieves the function of the PCC policy enforcement entity. The PDF and the PCC policy enforcement entity can also be disposed separately, in which case the PDF functions as an proxy forwarding entity for the PCC policy enforcement entity to perform protocol conversion and information distribution between the PCRF and the PCC policy enforcement entity. The PCC policy enforcement entity can be disposed in ASN, or in CSN, or in both ASN and CSN. For example, the PCC policy enforcement entity in CSN can be bound with HA.

The home agent (HA) is an agent of user data plane, and PCC policy enforcement entity in CSN (C-PCEF) can be bound with HA in order to optimize network architecture, so that when MS resides in the home network, the functions of policy enforcement, gating control of data plane and charging point can be implemented collectively. At this time, allocation of C-PCEF and allocation of HA can be considered collectively. If HA is allocated by a home AAA (HAAA) server, home-policy and charging enforcing function (H-PCEF) and HA both reside in the home network; if HA is allocated by a visited AAA (VAAA) server, C-PCEF in the visited network (V-PCEF) and HA both reside in the visited network. When MS roams to the visited network and if HA resides in the home network, home policy distribution function (H-PDF) entity does not perform signaling protocol conversion from interface R3 to interface Gx, or from interface R3 to interface Ty, and does not perform distribution of PCC rules and QoS mapping. H-PCEF only has the functions of data plane detection, gating control and charging point. H-PCRF provides PCC rules to the H-PCEF via interface Gx or interface Ty, H-PCEF and HA reside on the same data path, and the PCC rules are PCC rules for H-CSN. Charging policy enforcement function in the visited network (V-PCEF) entity or visited policy distribution function (V-PDF) entity is responsible for signaling protocol conversion from interface R3 to interface Gx or from interface R3 to interface Ty, distribution of PCC rules and/or QoS mapping, and provides PCC policy/rules to SFA in ASN. When MS roams to the visited network and home agent HA resides in the visited network, the H-PCRF provides PCC policy/rules of H-CSN to V-PCRF/V-PF entity in the visited network via interface R5, or interface Gx, or interface Ty, and the V-PCRF further executes decisions of the visited network and then provides PCC rules to the PCC policy enforcement entity via V-PDF. The PCC policy enforcement entity in ASN consists of one or more of an anchor service flow authorization (SFA) entity, a SFA for service, an anchor data path function (DPF), an accounting client, an accounting agent, and a service flow manager.

When PDF serves as the policy enforcement entity of an IP layer to enforce IP layer policy control based on IP QoS parameters distributed by PCRF, PDF provides the IP QoS parameters to QoS policy enforcement entity SFA of ASN, and SFA further maps the IP QoS parameters into access bearer QoS parameters to achieve the access network policy enforcement.

If PDF does not execute IP layer policy control based on the IP QoS parameters, SFA further maps QoS parameters authorized by the service layer or QoS parameters at the IP layer into access bearer QoS parameters to enforce policy of the access network.

After receiving the PCC rules, the service flow authorization entity anchored by the access network (Anchor SFA) divides the PCC rules, provides the accounting client with charging policy, and provides the service SFA with QoS policy. The accounting client or the service SFA further provides charging policy information to the accounting agent, and provides service flow detection information to anchor DPF. The accounting client charges based on the received charging policy information, and the anchor DPF performs service flow detection, based on the service flow detection information.

Anchor SFA serves as an anchor point of the PCC policy enforcement entity at ASN GW, and is responsible for receiving PCC rules sent from PCRF or PDF and transmitting the same to the service SFA, and for receiving message form the service SFA and reporting the message to PDF entity/PCRF. Anchor SFA is bound with an anchor authenticator of MS so that when re-authentication occurs at MS, anchor SFA is transferred to a new ASN-GW with the anchor authenticator. After anchor SFA transfers, it must perform position update or registration to PDF entity or PCRF entity (to be updated as new SFA identifier and/or SFA IP address), so that PCRF/PDF learns of the position of the new anchor SFA to facilitate transmission and request of PCC rules. This procedure of position update/registration of anchor SFA may be accompanying in IP session modification of the terminal, for instance, in the process of IP session modification of the terminal, anchor SFA identifier and/or SFA IP address are simultaneously updated, or a procedure of SFA position update is separately carried out.

The accounting agent reports charging record information either periodically or in real time to the accounting client (which may reside in ASN GW, or in CSN HA, or in the PCC policy enforcement entity in CSN (C-PCEF)), the accounting client that serves the terminal reports the charging record information to the AAA server via a charging interface defined by the current WiMAX, the AAA server serves as the unified port of the charging system to realize the Gy and Gz interfaces on AAA, and AAA further reports the charging record information to the online charging system and the offline charging system on the Gy and Gz interfaces. Alternatively, the accounting client that serves the terminal directly reports the charging record information to the online charging system and the offline charging system through the Gy interface and the Gz interface (the online charging system and the offline charging system can be implemented in AAA or exist as separate entities). Or, the accounting client that serves the terminal reports the charging record information to charging distribution function (CDF), and CDF further realizes the Gy and Gz interfaces, and reports the charging record information to the online charging system and the offline charging system on the Gy and Gz interfaces. The CDF can be integrated with PDF as illustrated in FIGS. 2A, 2B, and 3A.

Figure 2A:
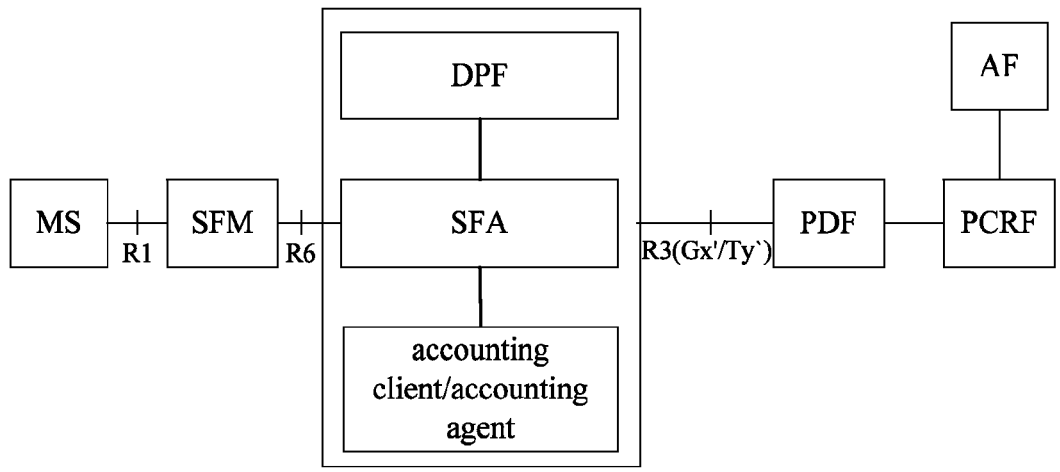
FIG. 2A is a schematic view showing convergence of a WiMAX network with a PCC architecture, according to the first embodiment of the present invention.
Figure 2B:
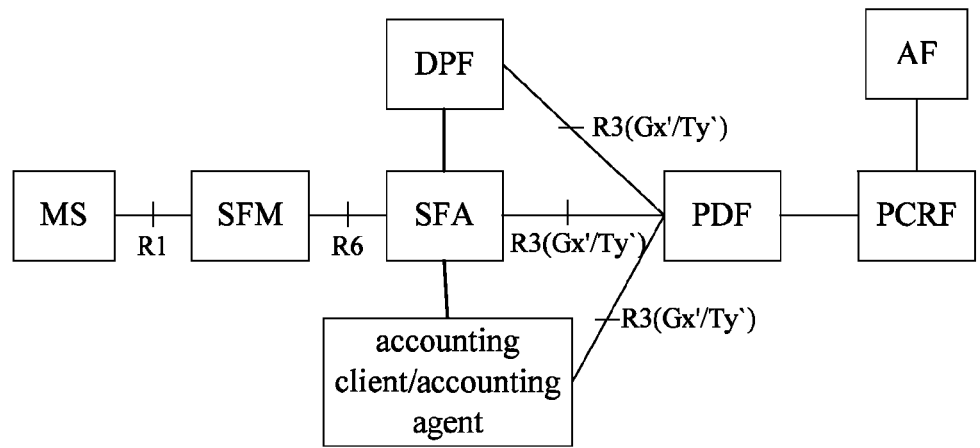
FIG. 2B is a schematic view showing convergence of a WiMAX network with a PCC architecture, according to the second embodiment of the present invention.
Figure 3A:
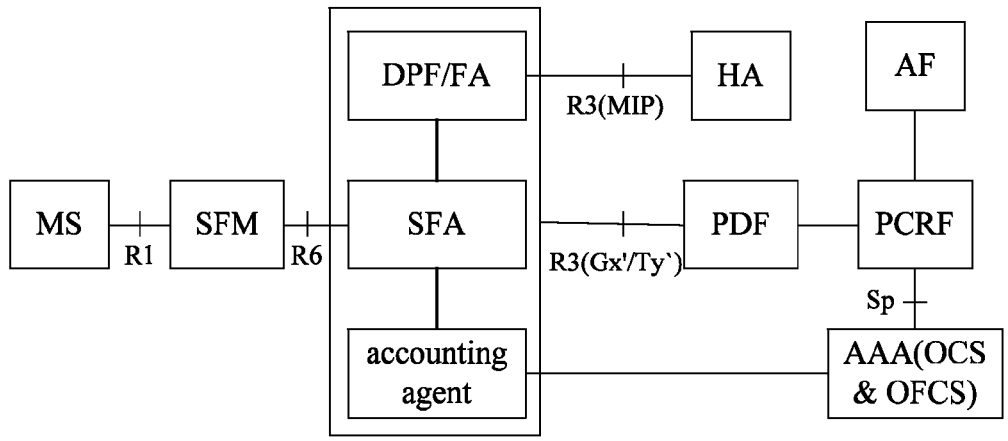
FIG. 3A is a schematic view showing convergence of a WiMAX network with a PCC architecture, according to the fifth embodiment of the present invention.

FIG. 2A is a schematic view showing convergence of a WiMAX network with a PCC architecture according to the first embodiment of the present invention. As shown in FIG. 2A, PDF is connected to ASN-GW via interface R3 and to PCRF via interfaces Gx/Ty. PDF serves as a protocol converter between PCRF and ASN-GW and/or a policy enforcer of the IP layer, that is to say, PDF converts message from interfaces Gx/Ty of PCRF into message of interface R3 to transmit the message to ASN-GW, and converts message from interface R3 of ASN-GW into message of interfaces Gx/Ty to transmit the message to PCRF. In particular, PDF can be connected to data path function (DPF) entity, or SFA, or accounting client/accounting agent in ASN-GW. The following description is made in the case PDF is connected to SFA in ASN-GW. PCRF determines PCC rules based on QoS parameters authorized by a service layer, charging policy information and user subscription information, and can further map QoS parameters authorized by the service layer into IP QoS parameters, so that QoS information contained in the PCC rules can either be QoS parameters authorized by the service layer or IP QoS parameters. PCRF provides the PCC rules to PDF. PDF converts PCC rules from PCRF from Gx/Ty interface message into R3 interface message and transmits the message to SFA. SFA performs QoS authorization and enforces QoS control policy in accordance with network resource condition of home ASN and QoS control policy in PCC rules, and transmits service data flow detection information in PCC rules to data path function (DPF) and transmits charging policy in PCC rules to the accounting client/accounting agent. If SFA resides in a different ASN-GW from DPF or the accounting client/accounting agent, SFA transmits corresponding information to DPF or the accounting client/accounting agent via interface R4; if SFA resides in the same ASN-GW as DPF or the accounting client/accounting agent, it transmits corresponding information to DPF or the accounting client/accounting agent via an internal interface. In the subsequent procedure, DPF classifies data flows based on the received service data flow detection information, and the accounting agent executes flow-based charging, in accordance with the received charging policy. The accounting agent reports charging record information either periodically or in real time to the accounting client, the accounting client that serves the terminal reports the charging record information to the AAA server via a charging interface defined by the current WiMAX, the AAA server serves as the unified port of the charging system to realize the Gy and Gz interfaces on AAA, and AAA further reports the charging record information to the online charging system and the offline charging system on the Gy and Gz interfaces. Alternatively, the accounting client that serves the terminal directly reports the charging record information to the online charging system and the offline charging system through the Gy interface and the Gz interface (the online charging system and the offline charging system can be implemented in AAA or exist as separate entities). Or, the accounting client that serves the terminal reports the charging record information to CDF, and CDF further realizes the Gy and Gz interfaces, and reports the charging record information to the online charging system and the offline charging system on the Gy and Gz interfaces. The CDF can be integrated with PDF as illustrated in FIG. 2A of this embodiment. As can be seen from the illustration in FIG. 2A, the real enforcing point for QoS control policy and charging are function entities in ASN GW, while PDF merely serves as an agent between ASN-GW and PCRF as well as a protocol converter between interface R3 and interfaces Gx/Ty. PDF can either be implemented in PCRF or exist as a separate entity.

Figure 2C:
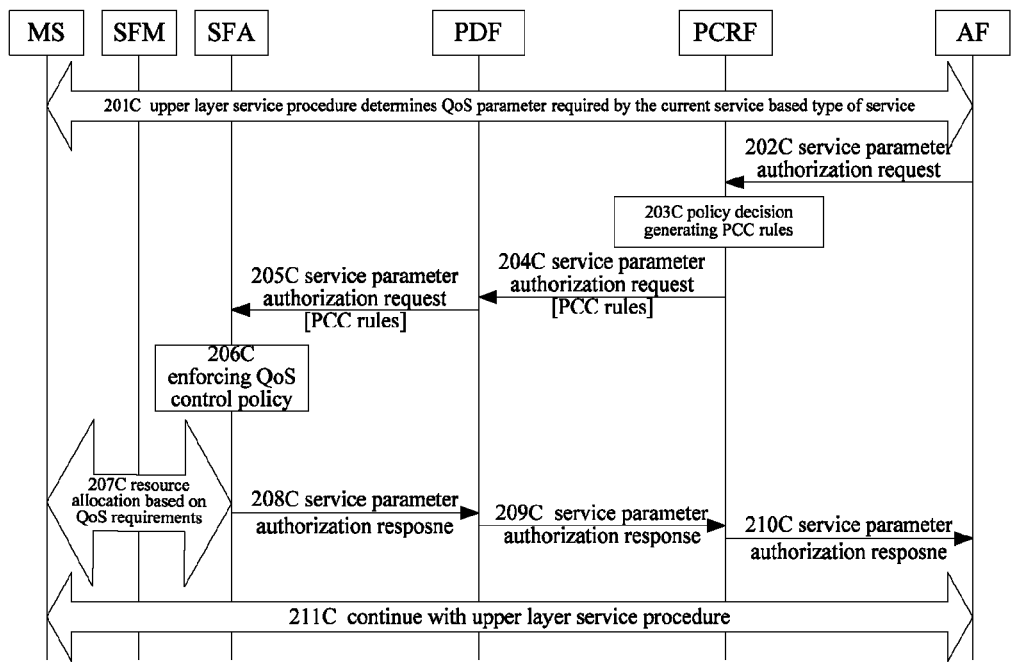
FIG. 2C is a flowchart showing the QoS authorization control, according to the third embodiment of the present invention.

FIG. 2C is a flowchart showing QoS authorization control in the third embodiment of the present invention. As shown in FIG. 2C, QoS authorization procedure triggered by AF comprises the following steps:

Step 201C: Proxy-call session control function (P-CSCF) of AF, such as an IP multimedia system (IMS) establishes interaction with MS at the application layer.

Step 202C: AF authorizes MS at the service layer, and sends a service parameter authorization request to PCRF to send QoS parameters authorized by the service layer and information associated with the service layer down to PCRF. Information associated with the service layer includes at least streaming media description information provided by AF to PCRF, such as WiMAX content, which includes such information as reduced resources indication and QoS priority. If MS resides in the visited network, AF will find the home PCRF (H-PCRF) based on the identifier of the user, such as an IMS private identifier, and send the QoS parameters authorized by the service layer and information associated with the service layer down to the H-PCRF.

Steps 203C-204C: After performing policy decision based on the QoS parameters authorized by the service layer and policy information and user subscription profiles, and determining that the home network can satisfy the QoS parameters required by AF, PCRF maps the QoS parameters authorized by the service layer into IP QoS parameters to generate PCC rules whose information can either be QoS parameters authorized by the service layer or IP QoS parameters, and subsequently sends a request for service parameter authorization to PDF and provides PCC rules to PDF. If PCRF determines it is impossible for the home network to satisfy QoS parameters required by AF, AF is notified of the incapability of the home network to satisfy QoS parameters, and AF performs the subsequent process such as modifying the QoS parameters. If MS resides in the visited network, H-PCRF performs policy decision to generate PCC rules based on QoS parameters authorized by the service layer, and provides the PCC rules to the visited PCRF (V-PCRF), which provides the PCC rules to V-PDF. Moreover, it is possible for V-PCRF to determine new PCC rules in accordance with the PCC rules provided by H-PCRF and home control policy decisions, and provide the new PCC rules to V-PDF. If MS resides in the visited network but there is no PCC control architecture deployed in the visited network, H-PCRF sends the PCC rules down to decision function entity V-PF of the visited network, which V-PF is similar to V-PCRF in function. At this time, protocol conversion is performed by V-PF or a dedicated protocol converter to convert the PCC rules into parameters recognizable by the WiMAX network, and new parameters such as QoS authorization are generated in accordance with control policy decisions of the home network to be sent down to the service flow authorization SFA for use there.

Step 205C: After receiving the PCC rules, PDF converts PCC rules for Gx/Ty interfaces into PCC rules for R3 interface, and sends a request for service parameter authorization to SFA and provides the PCC rules to SFA.

Step 206C: After receiving the PCC rules, if the QoS information included in the PCC rules are QoS parameters authorized by the service layer, SFA maps the QoS parameters authorized by the service layer into access bearer QoS parameters; if the QoS information included in the PCC rules are IP QoS parameters, SFA maps the IP QoS parameters into access bearer QoS parameters, and performs QoS authorization and enforces control policy after determining that the home network can satisfy QoS required by the PCC rules in accordance with the network resource condition of the home ASN and the QoS control policy in the PCC rules. If SFA determines it is impossible for the home network to satisfy QoS required by the PCC rules, AF is notified through PDF and PCRF of the incapability of the home network to satisfy QoS parameters, and AF performs the subsequent process such as modifying the QoS parameters. If PDF is only directly connected to SFA in ASN-GW, SFA transmits service data flow detection information in the PCC rules to DPF, and transmits charging policy in the PCC rules to the accounting client/accounting agent; if PDF is connected to SFA in ASN-GW, DPF and accounting client/accounting agent respectively, PDF divides PCC rules, transmits service data flow detection information in the PCC rules to DPF, and transmits charging policy in the PCC rules to the accounting client/accounting agent. PCC rules provided to SFA are QoS control policy in the PCC rules.

Step 207C: SFA carries out resource allocation and bearer establishment in accordance with QoS requirement.

Steps 208C-211C: SFA returns service parameter authorization response to PDF; after receiving the service parameter authorization response, PDF returns the service parameter authorization response to PCRF; after receiving the service parameter authorization response, PCRF returns the service parameter authorization response to AF. After receiving the service parameter authorization response, AF continues with upper layer service procedure.

In the service procedure, DPF classifies and detects data flows based on the received service data flow detection information, and the accounting agent performs flow-based charging in accordance with the received charging policy.

Other aspects in this embodiment are identical with those in the first embodiment.

Figure 2D:
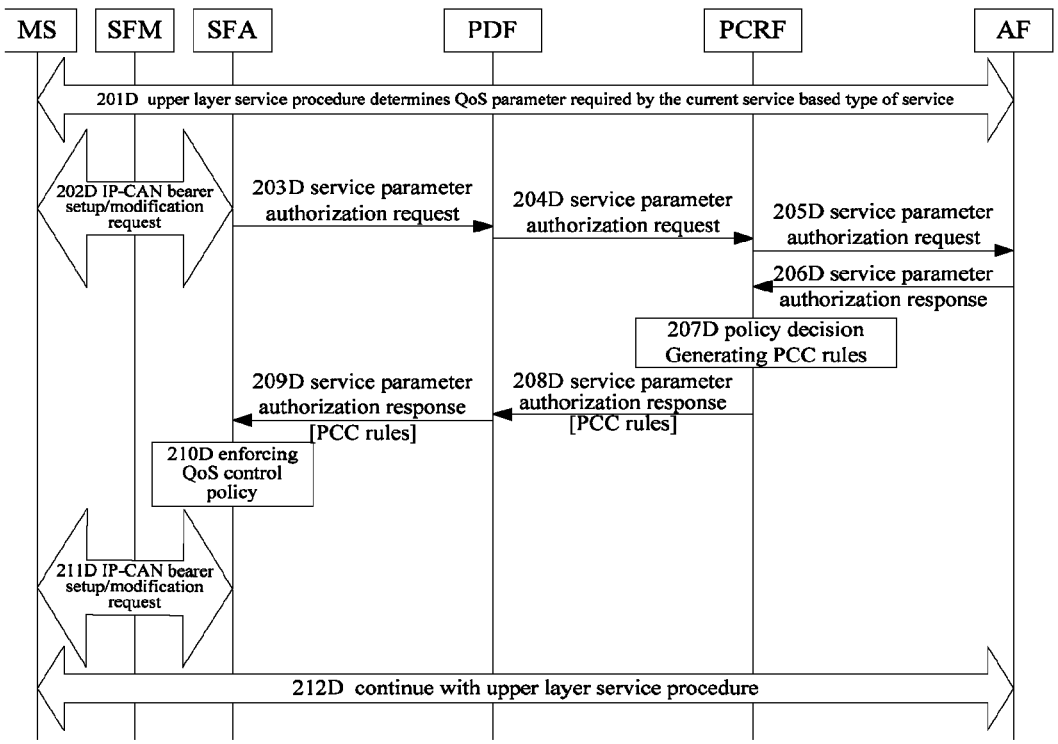
FIG. 2D is a flowchart showing the QoS authorization control, according to the fourth embodiment of the present invention.

FIG. 2D is a flowchart showing QoS authorization control in the fourth embodiment of the present invention. As shown in FIG. 2D, the QoS authorization procedure for setting up IP-CAN bearer and triggered by ASN includes the following steps:

Step 201D is identical with Step 201C.

Step 202D: MS initiates IP-CAN bearer establishment or modification request. The IP-CAN bearer establishment or modification request carries with home address of MS and bearer information, such as WiMAX session identifier, SFA identifier, for bearer binding.

Steps 203D-204D: SFA sends a request for service parameter authorization to PDF; after receiving the request for service parameter authorization, PDF converts the service parameter authorization request for interface R3 into service parameter authorization request for interface Gx/Ty, and sends the request for service parameter authorization to PCRF. If MS resides in the visited network, SFA sends the request for service parameter authorization to V-PDF (visited PDF), and, after receiving the request for service parameter authorization, V-PDF sends the request for service parameter authorization to V-PCRF (visited PCRF). V-PCRF transmits the request for service parameter authorization to policy decision function H-PCRF of the home network to request PCC rules.

Steps 205D-206D: After receiving the request for service parameter authorization, PCRF transmits the request for service parameter authorization to AF to request application layer information, such as QoS parameters authorized by the service layer and data mapping information, etc. The data mapping information includes at least streaming media description information. After receiving the request for service parameter authorization, AF sends a service parameter authorization response to PCRF and provides QoS parameters authorized by the service layer and the data mapping information corresponding to MS (identified by home address) to PCRF. If MS resides in the visited network, AF transmits the service parameter authorization response to V-PCRF.

Steps 207D-208D: After performing policy decision based on the QoS parameters authorized by the service layer, and determining that the home network can satisfy the QoS parameters required by AF, PCRF generates PCC rules, transmits a service parameter authorization response to PDF, and provides PCC rules to PDF. If PCRF determines it is impossible for the home network to satisfy QoS parameters required by AF, AF is notified of the incapability of the home network to satisfy QoS parameters, and AF performs the subsequent process such as modifying the QoS parameters. If MS resides in the visited network, V-PCRF provides QoS parameters authorized by the service layer to H-PCRF after receiving the service parameter authorization response. After performing policy decision based on the QoS parameters authorized by the service layer, and determining that the home network can satisfy the QoS parameters required by AF, H-PCRF generates PCC rules, returns the service parameter authorization response to V-PCRF, and provides the PCC rules. Moreover, it is possible for V-PCRF to determine new PCC rules in accordance with the PCC rules provided by H-PCRF and policy decisions of the home network. V-PCRF transmits the service parameter authorization response to V-PDF, and provides the PCC rules to V-PDF. If MS resides in the visited network but there is no PCC control architecture deployed in the visited network, H-PCRF sends the PCC rules down to the decision function entity V-PF of the visited network, which V-PF is similar to V-PCRF in function. At this time, protocol conversion is performed by V-PF or a dedicated protocol converter to convert the PCC rules into parameters recognizable by the WiMAX network, and new parameters such as QoS authorization are generated in accordance with control policy decisions of the home network to be sent down to the service flow authorization entity SFA for use there.

Step 209D: After receiving the PCC rules, PDF converts PCC rules for Gx/Ty interfaces into PCC rules for R3 interface, and sends the service parameter authorization response to SFA and provides the PCC rules to SFA.

Step 210D is identical with Step 206C.

Steps 211D-212D: SFA carries out bearer establishment and modification in accordance with QoS requirement. AF continues with upper layer service procedure.

In the service procedure, DPF classifies and detects data flows based on the received service data flow detection information, and the accounting agent performs flow-based charging in accordance with the received charging policy.

If PDF is only connected to DPF in ASN-GW or the accounting client/accounting agent, it is necessary for PDF to provide PCC rules, namely QoS control policy, to SFA through DPF or the accounting client/accounting agent.

Since PCC is disposed between the service control layer and the access or bearer layer, it shields the service control layer from the specific technology and topographic information of the access or bearer layer. PCC receives QoS authorization parameters associated with the service from the service control layer, combines the parameters with admission control policy and topographic information of the network, converts the service QoS parameters into IP QoS parameters, and provides the same to the node such as SFA of associated access or bearer layer. Subsequently, SFA achieves corresponding QoS control based on the received QoS parameters and the policy of the access or bearer network. Mappings of the IP QoS parameters and the access bearer QoS parameters can be performed on the PCC policy enforcement entity or PDF.

FIG. 3A is a schematic view showing convergence of a WiMAX network with a PCC architecture in the fifth embodiment of the present invention. As shown in FIG. 3A, at the same time of serving as an agent between ASN-GW and PCRF and as a protocol converter between interface R3 and interfaces Gx/Ty, PDF further enforces IP layer policy, that is to say, after receiving PCC rules, PDF maps the service QoS parameters into IP QoS parameters, as enforcing points of the IP layer policy control, and performs charging and gating control on data packets based on the IP QoS parameters with the flow-based charging policy in the IP layer. PDF can further map the IP QoS parameters into access bearer QoS parameters; PDF can also directly provide the IP QoS parameters to SFA, and SFA further maps the received IP QoS parameters into access bearer QoS parameters and enforces QoS policy of the access network. PDF provides SFA with QoS parameters (access bearer QoS parameters, or IP QoS parameters) through an interface with SFA, so that it is possible to perform separate QoS control and independent charging on the access bearer layer and the IP layer, and to shield the specific topographic architecture of the access bearer layer. After receiving the PCC rules, SFA transmits service data flow detection information in the PCC rules to DPF for filtering of the data packets, and transmits the charging policy in the PCC rules to the accounting client/accounting agent for charging. The connection relationship between PDF and ASN-GW can also be the same as shown in FIG. 2B, that is to say, PDF is connected to SFA in ASN-GW, DPF and the accounting client/accounting agent, respectively. The accounting agent reports charging record information either periodically or in real time to the accounting client, the accounting client that serves the terminal reports the charging record information to the AAA server via a charging interface defined by the current WiMAX, the AAA server serves as the unified port of the charging system to realize the Gy and Gz interfaces on AAA, and AAA further reports the charging record information to the online charging system and the offline charging system on the Gy and Gz interfaces. Or, the accounting client that serves the terminal directly reports the charging record information to the online charging system and the offline charging system through the Gy interface and the Gz interface (the online charging system and the offline charging system can be implemented in AAA or exist as independent entities). Or, the accounting client that serves the terminal reports the charging record information to CDF, and CDF further realizes the Gy and Gz interfaces, and reports the charging record information to the online charging system and the offline charging system on the Gy and Gz interfaces. The CDF can be integrated with PDF as illustrated in FIG. 3A of this embodiment. PDF/CDF can either reside in the domain of ASN or in the domain of CSN.

The home agent (HA) is an agent of user data plane, and, in order to optimize network architecture, PCC policy enforcement entity can be bound with HA, so that when MS resides in the home network, the functions of policy enforcement, gating control of data plane and charging point can be achieved collectively. At this time, allocation of the policy enforcement entity C-PCEF (CSN PCEF) in CSN and allocation of HA can be considered collectively. If allocated by a home AAA (HAAA) server, C-PCEF and HA reside in the home network; if allocated by a visited AAA (VAAA) server, C-PCEF and HA reside in the visited network. When MS roams to the visited network and if HA resides in the home network, C-PCEF described here is a home C-PCEF that only has the functions of data plane detection, gating and charging point. V-PDF in the visited network is responsible for performing conversion of R3/Gx or R3/Ty signaling protocol, distribution of PCC rules and QoS mapping.

Figure 3B:
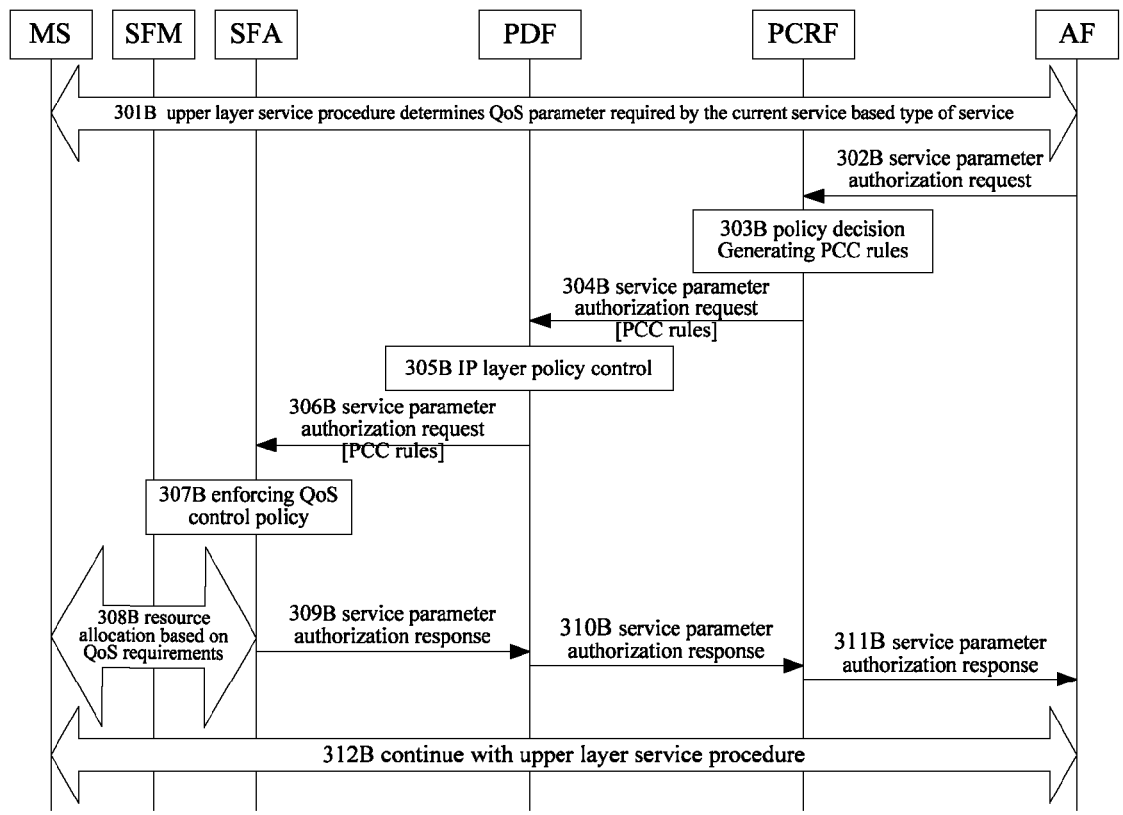
FIG. 3B is a flowchart showing QoS authorization control, according to the sixth embodiment of the present invention.

FIG. 3B is a flowchart showing QoS authorization control in the sixth embodiment of the present invention. The procedure of this embodiment differs from the fourth embodiment in the fact that PDF performs mapping of the IP QoS in the PCC rules into the QoS parameters of the access network, and sends the mapped QoS parameters of the access network down to the service flow authorization function SFA in the access network for enforcement there.

Figure 4A:
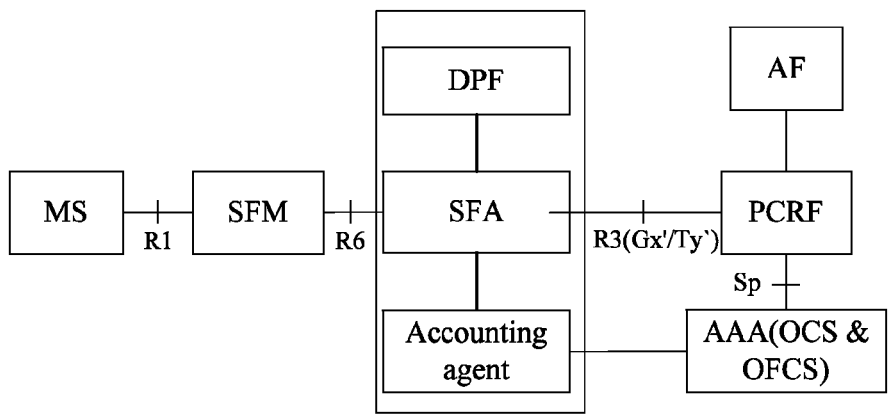
FIG. 4A is a schematic view showing convergence of a WiMAX network with a PCC architecture, according to the seventh embodiment of the present invention.

FIG. 4A is a schematic view showing convergence of a WiMAX network with a PCC architecture in the seventh embodiment of the present invention. As shown in FIG. 4A, PCRF serves as a policy deciding point to bind together the PCC policy enforcement entity serving as a policy enforcing point with ASN-GW. Such a close coupling makes it possible for the policy control and charging policy control of the WiMAX network to be closely combined with the PCC architecture, so that policy control system and charging policy control system of the WiMAX network are unified. Moreover, this manner conforms to the original intention of design for fusing the policy control architecture with the charging control architecture, simplifies the architectures of the functional entities in the network, curtails the signaling interactive procedure, and reduces the time for service establishment. Functions of the PCC policy enforcement entity are respectively achieved in one or more of SFA in ASN, DPF and the accounting client/accounting agent, SFM and HA in CSN. At this time, it is also necessary for the PCC policy enforcement entity to provide corresponding information to other functional entities, for instance, if the PCC policy enforcement entity is to be implemented in SFA, after SFA receives the PCC rules, it is also necessary to transmit the service data flow detection information in the PCC rules to DPF, and to transmit the charging policy in the PCC rules to the accounting client.

Anchor SFA serves as an anchor point of the PCC policy enforcement entity at ASN GW, and is responsible for receiving PCC rules sent down from PCRF, for requesting PCC rules from PCRF and for providing a PCC interface between the PCC policy enforcement entity and PCRF. When the terminal initially accesses the network, anchor SFA resides in service GW when MS initially accesses the network. Anchor SFA is bound with an anchor authenticator of MS so that when re-authentication occurs at MS, anchor SFA accompanies anchor authenticator to transfer to a new ASN GW.

The accounting agent reports charging record information either periodically or in real time to the accounting client, the accounting client in the PCC policy enforcement entity reports the charging record information to the AAA server via interface R3 of the current WiMAX, the AAA server serves as the unified port of the charging system to realize the Gy and Gz interfaces on AAA, and AAA further reports the charging record information to the online charging system and the offline charging system on the Gy and Gz interfaces. Or, the accounting client directly reports the charging record information to the online charging system and the offline charging system through the Gy interface and the Gz interface (the online charging system and the offline charging system can be implemented in AAA or exist as separate entities). In consideration of keeping consistent with the PCC architecture, SFA, DPF and the charging agent can be bound together. This manner differs from the prior art technology in the fact that the functions of PCEF are achieved by functional entity SFA of ASN-GW, DPF, the accounting client/accounting agent and/or SFM, and it is unnecessary to provide a dedicated protocol converter for interface R3 and interfaces Gx/Ty, as functions of protocol conversion can be achieved in ASN- GW, or it is achieved on interface R3 that Gx/Ty protocol supports transfer of PCC rules.

Figure 4B:
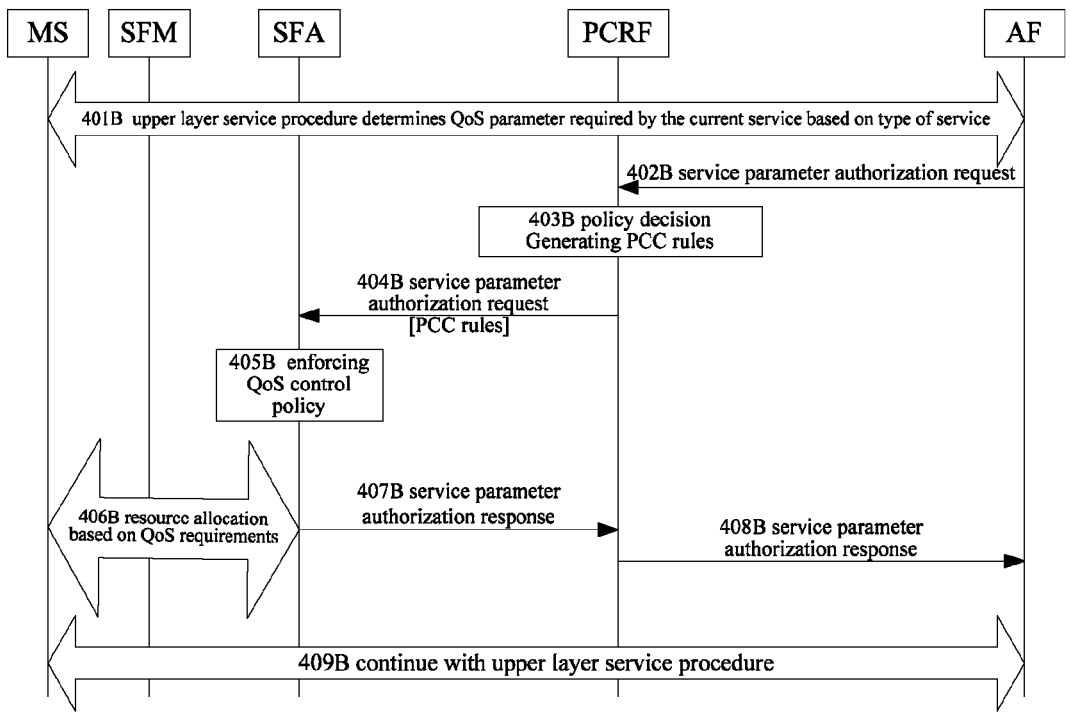
FIG. 4B is a flowchart showing QoS authorization control, according to the eighth embodiment of the present invention.

FIG. 4B is a flowchart showing QoS authorization control in the eighth embodiment of the present invention. As shown in FIG. 4B, QoS authorization procedure triggered by AF includes the following steps:

Steps 401B-402B are identical with Steps 201C-202C.

Steps 403B-404B: After performing policy decision based on the QoS parameters authorized by the service layer, and determining that the home network can satisfy the QoS parameters required by AF, PCRF generates PCC rules, transmits a request for service parameter authorization to SFA, and provides PCC rules to SFA. If PCRF determines it is impossible for the home network to satisfy QoS parameters required by AF, AF is notified of the incapability of the home network to satisfy QoS parameters, and AF performs the subsequent process such as modifying the QoS parameters. If MS resides in the visited network, H-PCRF performs policy decision to generate PCC rules based on the QoS parameters authorized by the service layer, and provides the PCC rules to V-PCRF, which in turn provides the PCC rules to SFA. Moreover, V-PCRF may determine new PCC rules in accordance with the PCC rules provided by H-PCRF and the local control policy decisions, and transmit the PCC rules to SFA. If MS resides in the visited network but there is no PCC control architecture deployed in the visited network, H-PCRF sends the PCC rules down to the decision function entity V-PF of the visited network, which V-PF is similar to V-PCRF in function. At this time, protocol conversion is performed by V-PF or a dedicated protocol converter to convert the PCC rules into parameters recognizable by the WiMAX network, and new parameters such as QoS authorization are generated in accordance with control policy decisions of the home network to be sent down to the service flow authorization entity SFA for use there.

Step 405B: After receiving the PCC rules, SFA converts the PCC rules for interfaces Gx/Ty into PCC rules for interface R3, maps QoS parameters authorized by the service layer into access bearer QoS parameters, and performs QoS authorization and enforces QoS control policy after determining that the home network can satisfy the QoS required by the PCC rules based on the network resource condition of the home ASN and QoS control policy in the PCC rules. If SFA determines it is impossible for the home network to satisfy QoS required by the PCC rules, AF is notified by PCRF of the incapability of the home network to satisfy QoS parameters, and AF performs the subsequent process such as modifying the QoS parameters. If PCEF is only implemented in SFA of ASN-GW, it is also necessary for SFA to transmit service data flow detection information in the PCC rules to DPF, and transmit charging policy in the PCC rules to the accounting client/accounting agent; if PCEF includes such functional entities as SFA in ASN, DPF and the accounting agent and/or service flow manager SFM, SFA obtains QoS control policy in the PCC rules, DPF obtains service data flow detection information in the PCC rules, and the accounting client/accounting agent obtains charging policy in the PCC rules.

Step 406B is identical with Step 207C.

Steps 407B-409B: SFA returns the service parameter authorization response to PCRF; after receiving the service parameter authorization response, PCRF returns the service parameter authorization response to AF. After receiving the service parameter authorization response, AF continues with upper layer service procedure.

In the service procedure, DPF classifies and detects data flows based on the received service data flow detection information, and the accounting agent performs flow-based charging in accordance with the received charging policy.

Figure 4C:
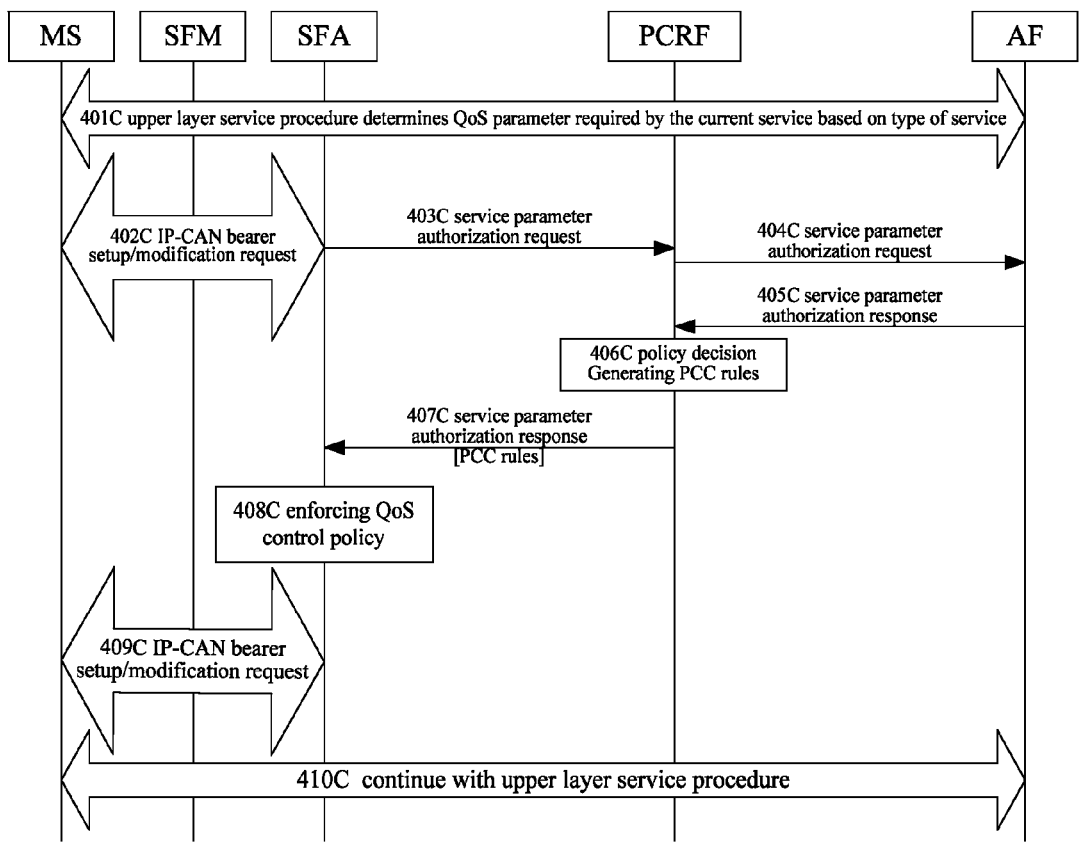
FIG. 4C is a flowchart showing QoS authorization control, according to the ninth embodiment of the present invention.

FIG. 4C is a flowchart showing QoS authorization control in the ninth embodiment of the present invention. As shown in FIG. 4C, the QoS authorization procedure for setting up IP-CAN bearer, triggered by ASN, includes the following steps:

Steps 401C-402C are identical with Steps 201D-202D.

Step 403C: SFA sends a request for service parameter authorization to PCRF.

If MS resides in the visited network, SFA sends the request for service parameter authorization to V-PCRF, and V-PCRF transmits the request for service parameter authorization to policy decision function entity H-PCRF of the home network to request PCC rules.

Steps 404C-405C are identical with Steps 205D-206D.

Steps 406C-407C: After performing policy decision based on the QoS parameters authorized by the service layer and charging policy information and user subscription profiles, and determining that the home network can satisfy the QoS parameters required by AF, PCRF generates PCC rules, transmits a service parameter authorization response to SFA, and provides PCC rules to SFA. If PCRF determines it is impossible for the home network to satisfy QoS parameters required by AF, AF is notified of the incapability of the home network to satisfy QoS parameters, and AF performs the subsequent process such as modifying the QoS parameters. If MS resides in the visited network, V-PCRF provides QoS parameters authorized by the service layer to H-PCRF after receiving the service parameter authorization response. After performing policy decision based on the QoS parameters authorized by the service layer, and determining that the home network can satisfy the QoS parameters required by AF, H-PCRF generates PCC rules, returns the service parameter authorization response to V-PCRF, and provides the PCC rules. Moreover, V-PCRF may determine new PCC rules in accordance with the PCC rules provided by H-PCRF and home control policy decisions. V-PCRF transmits the service parameter authorization response to V-PCEF, and provides the PCC rules to V-PCEF. If MS resides in the visited network but there is no PCC control architecture deployed in the visited network, H-PCRF sends the PCC rules down to decision function entity V-PF of the visited network, which V-PF is similar to V-PCRF in function. At this time, protocol conversion is performed by V-PF or a dedicated protocol converter to convert the PCC rules into parameters recognizable by the WiMAX network, and new parameters such as QoS authorization are generated in accordance with control policy decisions of the home network to be sent down to the service flow authorization SFA for use there.

Step 408C is identical with Step 405B.

Steps 409C-410C are identical with Steps 211D-212D.

In the service procedure, DPF classifies and detects data flows based on the received service data flow detection information, and the accounting agent performs flow-based charging in accordance with the received charging policy.

When PCEF is integrated with the PCC policy enforcement entity, PCC rules are provided to other PCC policy enforcement entities (such as the accounting client and the data path function, DPF, entity) via an internal interface.

Serving as a policy deciding point, PCRF can reside in the domain of CSN. PCRF is connected to the AAA server via interface Sp, on which not only description files can be obtained, but information concerning charging key of rate information to which service data flows correspond is also obtained.

The accounting client reports charging record, which is generated through statistics by the accounting agent, to the AAA server. If the AAA server serves as a unified port of charging system of the PCC architecture, AAA further reports the charging record information to the online charging system and the offline charging system on the Gy and Gz interfaces. Or, the accounting client that serves the terminal directly reports the charging record information to the online charging system and the offline charging system through the Gy interface and the Gz interface. Or, the accounting client that serves the terminal reports the charging record information to CDF via a charging interface of R3-PCC, and CDF further implements Gy and Gz interfaces and reports the charging record information to the online charging system and the offline charging system on the Gy and Gz interfaces. The online charging system and the offline charging system can be implemented in AAA or exist as independent entities.

In the embodiments proposed in the present invention, PCRF determines the PCC rules based on the QoS parameters authorized by a service layer and charging policy and user subscription profiles, PDF serves as an interface between PCRF and the PCC policy enforcement entity to perform protocol conversion and information distribution, and the PCC policy enforcement entity executes QoS authorization and charging on a service data flow in accordance with the PCC rules, whereby a practically feasible solution is proposed for fusing a WiMAX network with 3GPP/3GPP2 network PCC architecture, it is realized that the WiMAX network achieves policy control and charging control of services by adopting a PCC architecture, and the problem of fusing the functional entities in the PCC architecture with such functional entities in the WiMAX network as the policy control entities SFA, DPF, the accounting client/accounting agent and/or HA etc., and whereby a processing flow and a fusing solution are proposed for the WiMAX network to achieve policy control and charging control of services by adopting the PCC architecture. Convergence of the WiMAX network with the PCC architecture is achieved in the basic process of service establishment to execute policy control and charging control of services, and problems in relation to the interconnection between the WiMAX network and the 3GPP/3GPP2 network through a unified PCC architecture while using IMS services are solved. In addition, the present invention provides several feasible modes of implementation that can be flexibly adopted upon practical demand.

As comprehensible to persons skilled in the art, the present invention is not only applicable to a converged network in which the WiMAX network and the 3GPP/3GPP2 network are converged, but also to wireless and wired converged communication networks of other types.

Apparently, it is possible for persons skilled in the art to make various variations and modifications to the present invention without departing from the principles and scopes of the present invention. Accordingly, the present invention is intended to cover such variations and modifications provided that they fall within the scope of the claims and equivalents thereof.

What is claimed is:

1. A system of network convergence policy and charging control architecture, comprising an access service network (ASN), a connectivity service network (CSN), a policy control and charging rule function (PCRF), a policy distribution function (PDF) and a policy and charging control (PCC) policy enforcement entity in a Worldwide Interoperability for Microwave Access (WiMAX) network, wherein
    the PCRF and the PDF are separated;
    the PCRF is configured to determine policy and charging control PCC rules based on quality of service (QoS) parameters authorized by a service layer and user subscription profiles, and provide the PCC rules to the PDF;
    the PDF is configured to serve as an interface between the PCRF and the PCC policy enforcement entity to perform information distribution; and
    the PCC policy enforcement entity is configured to execute a QoS control policy and charging on a service data flow in accordance with the PCC rules.

2. The system according to claim 1, wherein the PDF is provided in at least one of:
    the PCRF, a home agent (HA) and the ASN.

3. The system according to claim 1, wherein,
    the PCC policy enforcement entity is provided in the CSN and bound with the HA in the CSN.

4. The system according to claim 2, wherein,
    the PDF is connected to an anchor service flow authorization (SFA) in the ASN, the anchor SFA is configured to provide the QoS control policy in the PCC rules to the service SFA, provide service data flow detection information in the PCC rules to a data path function (DPF), and provide charging policy in the PCC rules to one of an accounting client and an accounting agent.

5. The system according to claim 1, wherein,
    the PCC policy enforcement entity is configured to generate charging record information based on the received charging statistic information, and report the charging record information to an accounting server via a charging distribution function (CDF); and
    the accounting server comprises at least one of an online charging system (OCS), an offline charging system (OFCS) and an authentication authorization accounting (AAA) server.

6. The system according to claim 5, wherein the system further comprises one of the group consisting of:
    if the AAA server is configured to serve as a unified port in a PCC architecture charging system connected to the accounting client, the PCC policy enforcement entity is configured to report charging information to the AAA, and then the AAA reports the charging information to one of the OCS and the OFCS via Gy and Gz interfaces;
    the PCC policy enforcement entity is configured to connect to the online charging system and the offline charging system via the Gy interface and the Gz interface to report the charging record information;
    the PCC policy enforcement entity is configured to report the charging information to the CDF, and the CDF is configured to connect to the online charging system and the offline charging system via the Gy interface and the Gz interface to report the charging record information; and
    one of the OCS and OFCS resides in the AAA server, and the PCC policy enforcement entity is configured to report the charging information to the AAA server via the Gy or Gz interfaces.

7. The system according to claim 5, wherein,
    the PCC policy enforcement entity is configured to perform one of an internet protocol (IP) layer charging function and a service flow-based charging function.

8. A system of network convergence policy and charging control architecture, comprising a policy control and charging rule function (PCRF), a policy distribution function (PDF) and a policy and charging control (PCC) policy enforcement entity, wherein
    the PCRF and the PDF are separated;
    the PCRF is configured to determine policy and charging control PCC rules based on quality of service (QoS)

parameters authorized by a service layer and user subscription profiles, and provide the PCC rules to the PDF;

the PDF is configured to serve as an interface between the PCRF and the PCC policy enforcement entity to perform information distribution; and the PCC policy enforcement entity is configured to execute a QoS control policy and charging on a service data flow in accordance with the PCC rules.

9. The system according to claim 8, wherein the PCC policy enforcement entity comprises a service flow authorization (SFA), a data path function (DPF), one of an accounting client and an accounting agent, and a service flow manager (SFM), wherein the SFA is configured to enforce the QoS control policy based on a network resource condition of a home access service network (ASN) and the QoS control policy in the PCC rules, transmit service data flow detection information in the PCC rules to the DPF, and transmit a charging policy in the PCC rules to one of the accounting client and the accounting agent.

10. The system according to claim 9, wherein,
the PCRF is further configured to map QoS parameters authorized by the service layer into internet protocol (IP) QoS parameters and provide the IP QoS parameters to the PDF; or
the PDF is further configured to map the QoS parameters authorized by the service layer into IP QoS parameters.

11. The system according to claim 10, wherein,
the PDF is further configured to map the IP QoS parameters into access bearer QoS parameters and provide the access bearer QoS parameters to the PCC policy enforcement entity; or
the PDF is further configured to provide the IP QoS parameters to the PCC policy enforcement entity, and the PCC policy enforcement entity is further configured to map the IP QoS parameters into the access bearer QoS parameters.

12. The system according to claim 8, wherein,
the PCC policy enforcement entity is configured to generate charging record information based on received charging statistic information, and report the charging record information to a accounting server via a charging distribution function (CDF);
the accounting server comprises one of an online charging system (OCS), an offline charging system (OFCS), and an authentication authorization accounting (AAA) server; and
the PCC policy enforcement entity is configured to perform one of an IP layer charging function and a service flow-based charging function.

13. A policy and charging control method of a network convergence policy and charging control architecture, comprising:

obtaining, by a policy distribution function (PDF), policy and charging control (PCC) rules determined by a policy control and charging rule function (PCRF) based on quality of service (QoS) parameters authorized by a service layer and user subscription profiles;

providing, by the PDF, the PCC rules to a PCC policy enforcement entity; and enforcing, by the PCC policy enforcement entity, a QoS authorization and charging on a service data flow in accordance with the PCC rules.

14. The method according to claim 13, wherein the step of the PDF providing the PCC rules to the PCC policy enforcement entity comprises:

performing, by the PDF, a protocol conversion by loading the PCC rules onto an interface protocol supported by the PCC policy enforcement entity, and transmitting the PCC rules to the PCC policy enforcement entity.

15. The method according to claim 13, further comprising, after the PDF receives the PCC rules:

obtaining, by the PCRF, internet protocol (IP) QoS parameters by mapping the QoS parameters authorized by the service layer, and providing the IP QoS parameters to the PDF, or obtaining, by the PDF, the IP QoS parameters by mapping QoS parameters authorized by the service layer.

16. The method according to claim 15, further comprising, after the PDF receives the PCC rules:

mapping, by the PDF, the IP QoS parameters into access bearer QoS parameters and providing the access bearer QoS parameters to the PCC policy enforcement entity; or providing, by the PDF, the IP QoS parameters to the PCC policy enforcement entity, and mapping, by the PCC policy enforcement entity, the IP QoS parameters into the access bearer QoS parameters.

17. The method according to claim 16, wherein,
the PCC policy enforcement entity performs one of an IP layer policy control based on the IP QoS parameters and a service flow policy control based on the access bearer QoS parameters.

18. The method according to claim 13, wherein the PCC policy enforcement entity in the access service network (ASN) comprises at least one of a service flow authorization (SFA), a data path function (DPF), an accounting client or accounting agent, and a service flow manager (SFM); and the PDF is connected to the SFA, and the method further comprises, after the ASN receives the PCC rules: transmitting, by the SFA, service data flow detection information in the PCC rules to the DPF, and transmitting charging policy in the PCC rules to the accounting client or the accounting agent.

19. The method according to claim 13, wherein the PCC policy enforcement entity in the access service network (ASN) comprises one or more of a service flow authorization (SFA), a data path function (DPF), an accounting client or accounting agent, and a service flow manager (SFM);

the method further comprises, after the PCC policy enforcement entity in the ASN receives the PCC rules: mapping, by the SFA, the QoS parameters authorized by the service layer into access bearer QoS parameters; or the method further comprises, after the PCC policy enforcement entity in the ASN receives the PCC rules: providing, by the PDF, the IP QoS parameters to the SFA, and mapping, by the SFA, the IP QoS parameters into the access bearer QoS parameters.

20. The method according to claim 13, wherein, when a terminal roams to a visited network, a visited PCRF in the visited network requests a home PCRF for the PCC rules and enforcement of decisions of the visited network, and provides decided PCC rules to the visited PDF; or the home PCRF in a home network provides the PCC rules to the visited PCRF of the visited network by a protocol converter, which converts the PCC rules and provides converted parameters to the visited PCRF of the visited network, and the visited PCRF further enforces decisions of the visited network.

21. The method according to claim 20, wherein,
when the terminal roams to the visited network and the home agent (HA) resides in the home network, the home PCRF provides PCC policy or rules to the PCC policy enforcement entity in the home connectivity service network (CSN), and the visited PCRF further performs decision on the visited network and then provides the PCC policy or rules to the PCC policy enforcement entity via the visited PDF; and when the terminal roams to the visited network and the HA resides in the visited network, the home PCRF provides the PCC policy or rules of the home CSN to the visited PCRF in the visited network, and the visited PCRF further performs decision on the visited network and then provides the PCC policy or rules to the PCC policy enforcement entity via the visited PDF.

22. The method according to claim 13, wherein the PCRF provides PCC rules to the PCC policy enforcement entity in CSN (C-PCEF), and the PCC policy enforcement entity in the CSN enforces QoS or a charging policy in accordance with the PCC policy or rules.

* * * * *